United States Patent [19]

Droguet et al.

[11] 4,422,731

[45] Dec. 27, 1983

[54] DISPLAY UNIT WITH HALF-STUD, SPACER, CONNECTION LAYER AND METHOD OF MANUFACTURING

[75] Inventors: Jean-Paul Droguet, Courbevoie; Michel Vernay, Paris, both of France

[73] Assignee: Societe Industrielle des Nouvelles Techniques Radioelectriques Societe Anonyme dite, Asnieres, France

[21] Appl. No.: 261,083

[22] Filed: May 6, 1981

[30] Foreign Application Priority Data

May 8, 1980 [FR] France .............................. 80 10274

[51] Int. Cl.³ .............................................. G02F 1/13
[52] U.S. Cl. ..................................... 350/344; 350/334; 445/24
[58] Field of Search ............... 350/334, 343, 344, 336, 350/356, 357; 29/25.13; 445/24, 25

[56] References Cited

U.S. PATENT DOCUMENTS

| | | |
|---|---|---|
| 3,858,284 | 1/1975 | Costa et al. |
| 3,939,556 | 2/1976 | Borel et al. ..................... 350/343 X |
| 4,024,613 | 5/1977 | Martel et al. ..................... 29/25.13 |
| 4,104,727 | 8/1978 | Washizuka et al. ............ 350/334 X |
| 4,130,408 | 12/1978 | Crossland et al. .................. 350/343 |
| 4,145,120 | 5/1979 | Kubota .............................. 350/334 X |
| 4,256,382 | 3/1981 | Piliavin et al. ....................... 350/334 |

FOREIGN PATENT DOCUMENTS

| | | |
|---|---|---|
| 2242389 | 8/1972 | Fed. Rep. of Germany . |
| 2828647 | 1/1979 | Fed. Rep. of Germany ...... 350/343 |
| 2235445 | 1/1975 | France . |
| 2266926 | 10/1975 | France . |
| 2272408 | 12/1975 | France . |

OTHER PUBLICATIONS

Addy et al., "Liquid Crystal Cell Seal", *IBM Technical Disclosure Bulletin*, vol. 23, No. 11, Apr. 1981, p. 511.
IBM Technical Disclosure Bulletin, vol. 21, No. 8, Jan. 1979, New York (US), C. H. Perry: "Aluminum Spacer Bond Medium", p. 3254.

*Primary Examiner*—John L. Corbin
*Assistant Examiner*—David Lewis
*Attorney, Agent, or Firm*—Donald E. Zinn

[57] ABSTRACT

A two dimensional display unit with an electrically controlled fluid and a method of manufacturing it. A layer of liquid crystal whose birefringence is electrically controlled is disposed between two thin glass plates which bear transparent electrodes and are connected together by metal studs regularly spaced apart over the whole useful surface so as to maintain a gap of constant thickness, the cell thus constituted being illuminated by parallel light and placed between crossed polarizer and analyzer. The invention applies to displaying various images at a low cost.

7 Claims, 6 Drawing Figures

DISPLAY UNIT WITH HALF-STUD, SPACER, CONNECTION LAYER AND METHOD OF MANUFACTURING

The present invention relates to a two-dimensional display unit with an electrically controlled fluid, said display unit including:
- a transparent front plate;
- a back plate disposed face to face with the front plate, a predetermined micrometric gap being maintained between them by a plurality of spacer studs all of identical thickness disposed between the front plate and the back plate and spaced out on the surfaces of these plates;
- a sealing strip which joins these two plates along the edge of an inner zone which includes these studs to form a sealed chamber between these plates throughout said zone;
- a fluid having an optical characteristic which can be electrically controlled and which is disposed in this chamber so as to form a thin active layer therein;
- electrodes disposed on the two plates to apply various electric display signals to various points of this active layer so as to control the value of said optical characteristic at each of these points;
- connections to transmit these display signals to these electrodes; and
- control circuits to generate these display signals so as to form a useful image in this active layer.

BACKGROUND TO THE INVENTION

The invention also relates to a method of manufacturing such a display unit.

A display unit here means any unit for generating stationary or moving images from electric signals, said images being constituted by typographical characters and/or by line drawings and, possibly, having various shades or values of grey.

Although a usual television screen constitutes such a display unit, the present invention does not relate to such a TV screen, since the optically active layer, i.e. its layer which generates the image, of a TV screen is not usually constituted by a fluid.

In contrast, plasma display units and liquid crystal display units constitute known types of display unit which include layers of optically active fluid. Such layers are disposed between two plates at least one of which, namely, the front plate, is transparent and has optical characteristics controlled by electric signals.

In the case of liquid crystal display units to which the invention advantageously applies, the front and back plates carry row electrodes and column electrodes constituted by transparent conductive strips. The active layer of liquid crystal must have a micrometric thickness, i.e. a thickness which lies between 2 microns and 100 microns, e.g. of the order of 10 microns. This thickness must be perfectly constant over the whole of the useful portion of the layer, the tolerance being of the order of 7% in the case of a nematic liquid crystal whose birefringence is electrically controlled and with which it is required to obtain 16 shades of grey.

It is difficult to keep to such a tolerance when the useful surface of the display unit is not small, e.g. when this surface is 15 cm wide and 9 cm high. To do so, it is known to produce both the plates in the form of two perfectly plane glass plates which are very rigid and are fixed by their edges to the frame of the display unit. The necessary rigidity is obtained by choosing very thick plates, e.g. 12 mm thick, whose planeness results from a smoothing operation. Insulating shims are disposed between the two plates in the neighbourhood of their edges to maintain the required gap between them. A peripheral sealing strip makes it possible to form a sealed chamber between these two plates.

The cost price of plates for known display units is very high and restricts the field of application of these display units.

That is why it has been proposed to use relatively thin, resilient plates and to maintain a suitable distance between these plates by spacers inserted between them and spaced out over the whole useful surface of the display unit. Such a disposition is described in document U.S. Pat. No. 4,130,048 (Crossland).

The cost price of display units thus produced is however still high in particular because it is difficult to make the numerous electric connections between the control circuits and the transparent electrodes.

The present invention aims to provide a two-dimensional display unit which contains an electrically controlled fluid layer and in which it is very easy to make the electric connections, to keep the thickness of the optically sensitive layer very constant without using rigid glass plates and to assemble the two plates.

SUMMARY OF THE INVENTION

In particular, the invention provides a two-dimensional display unit with an electrically controlled fluid, said display unit including:
- a transparent front plate;
- a back plate disposed face to face with the front plate, a predetermined micrometric gap being maintained between them by a plurality of spacer studs all of identical thickness disposed between the front plate and the back plate and spaced out on the surfaces of these plates;
- a sealing strip which joins these two plates along the edge of an inner zone which includes these studs to form a sealed chamber between these plates throughout said zone;
- a fluid having an optical characteristic which can be electrically controlled and which is disposed in this chamber so as to form a thin active layer therein;
- electrodes disposed on the two plates to apply various electric display signals to various points of this active layer so as to control the value of said optical characteristic at each of these points;
- connections to transmit these display signals to these electrodes; and
- control circuits to generate these display signals so as to form a useful image in this active layer.

The improvement lies wherein one of said plates in said display unit is a carrier plate which carries control circuits each of which generates several display signals intended respectively to reach several of said electrodes carried by this plate;
- said carrier plate also carrying connection tracks to constitute at least partially the connections between the control circuits and the electrodes;
- each of said spacer studs being constituted by two half studs each of which adheres to one of said two plates and by a connection layer which connects the half studs together; and
- the half studs and the connection tracks being made of the same metal.

The present invention also provides a method of manufacturing such a two-dimensional display unit which contains an electrically controlled layer of fluid, this method including the following steps:

depositing electrodes on a transparent front plate and on a back plate;

fixing these two plates face to face so as to leave a constant micrometric gap between their facing "inside" surfaces;

depositing a sealing strip which joins these two plates together along the edge of an "inner zone" to form a sealed chamber between the two plates, this inner zone containing said electrodes;

filling this chamber with a fluid having an optical characteristic which is electrically controllable; and connecting said electrodes to control circuits which are suitable for supplying display signals to control said optical characteristic.

The improvement lies wherein said step during which the two plates are fixed face to face itself includes the following steps:

depositing adhesive metal half studs on each of the inside surfaces in such a way that each half stud deposited on one plate is in register with a half stud deposited on the other plate, at least some of these studs being spacer studs spaced out in said inner zone;

depositing a connection layer on the tops of the half studs of at least one of the plates;

installing the two plates with contact between the tops of the half studs which face each other; and forming connections between the half studs in contact via said connection layer so as to form studs which join the two plates together.

BRIEF DESCRIPTION OF THE DRAWINGS

A non-limiting description will be given hereinafter with reference to the accompanying schematic figures to show how the invention can be put into practice.

DESCRIPTION OF PREFERRED EMBODIMENT

Figure 6:
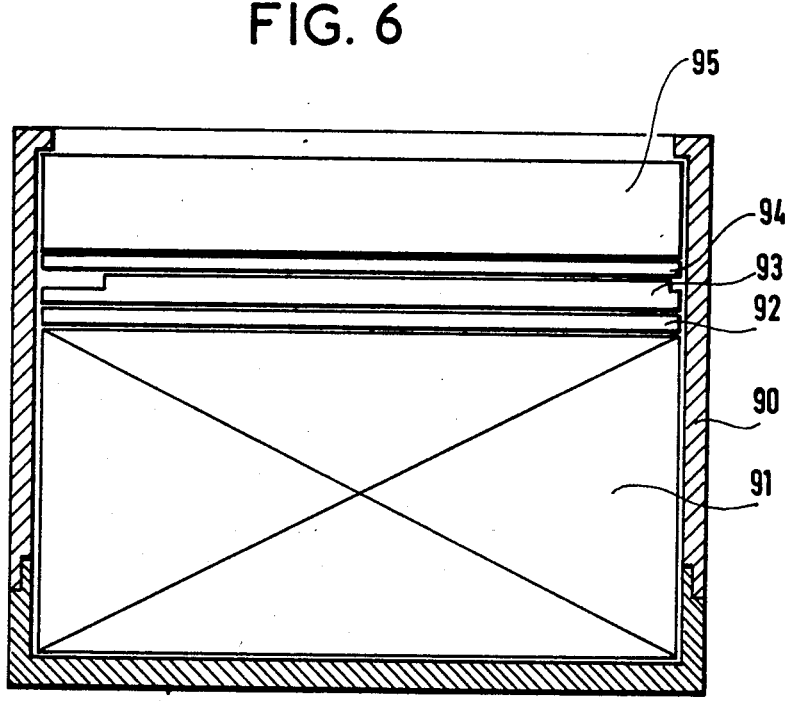
FIG. 6 illustrates a cross-section of the display unit of FIG. 1, with the cross-section plane perpendicular to the plates.

The display unit described is disposed in a frame 90 which is open at the front (see FIG. 6). It includes a light-generator 91 disposed at the bottom of this frame to supply a parallel horizontal light beam 15 cm wide and 9 cm high which passes in series through the following components disposed in a succession of planes perpendicular to the beam:

a polarizer 92;

a transparent cell 93 which is described hereinafter and which contains a layer of liquid crystal with electrically-controlled birefringence. The cell modifies the polarization of the light which passes through it. It thus forms an image by an independent control means which controls 106496 points arranged in 416 vertical columns and 256 rows;

a polarization analyser 94 to display the image thus formed; and an optical diffuser 95 which also mechanically protects the cell.

The cell 93, made of two thin rectangular glass plates will now be described.

Figure 1:
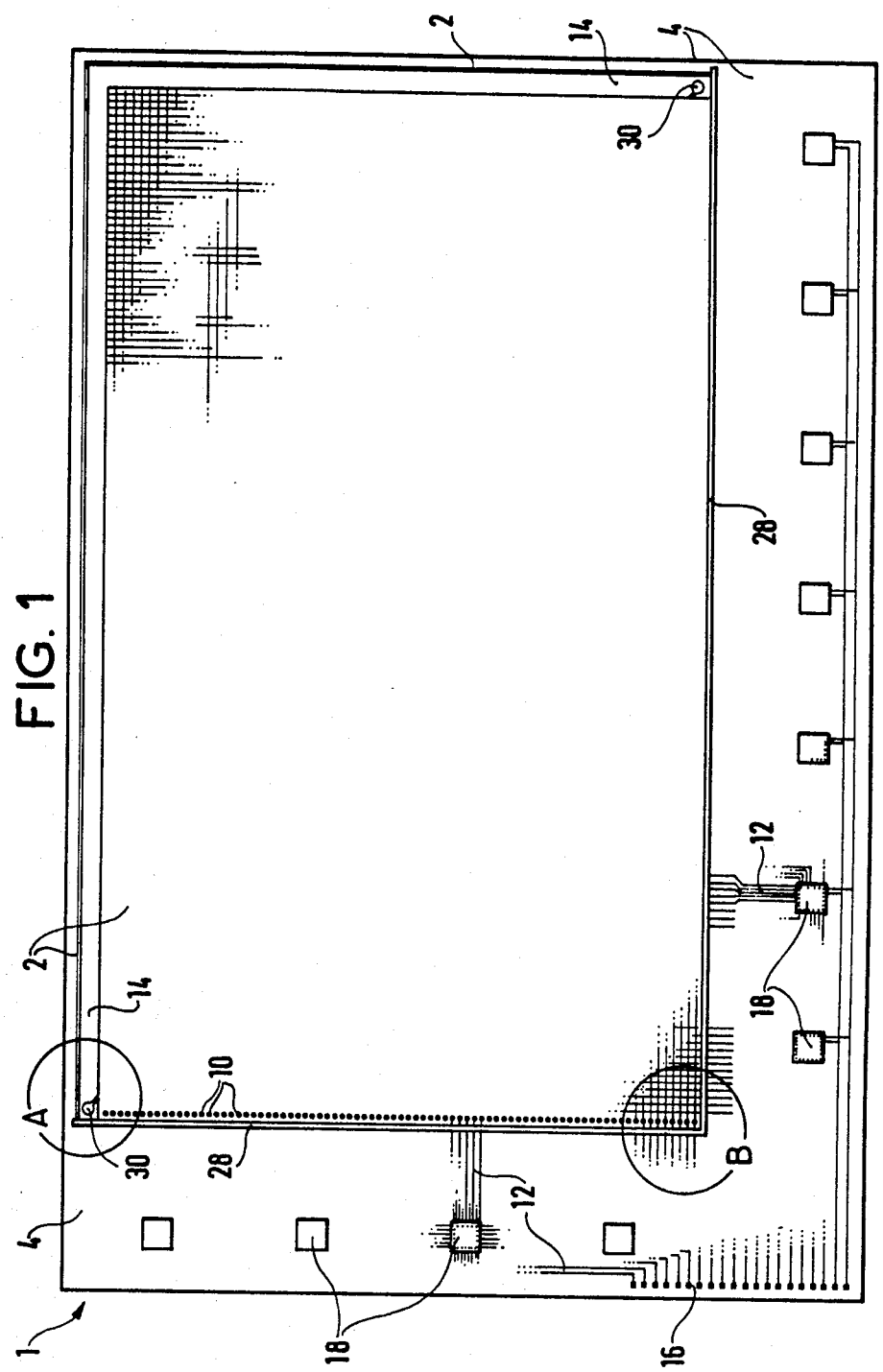
FIG. 1 is a front view of the cell of a display unit in accordance with the invention.
Figure 2:
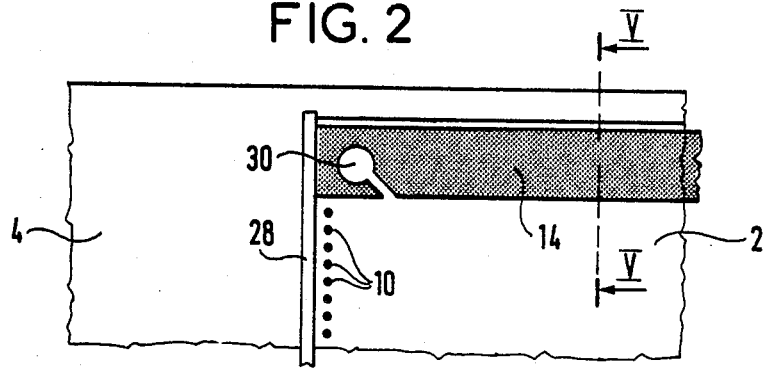
FIG. 2 illusrates a detail A of FIG. 1.
Figure 3:
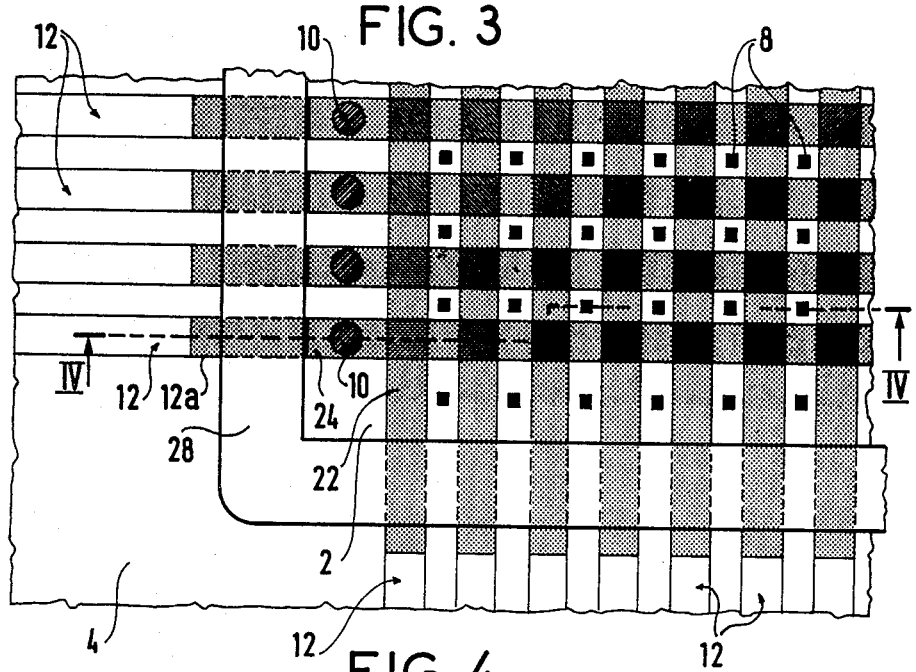
FIG. 3 illustrates a detail B of FIG. 1.

In accordance with FIG. 1, a front plate 2 is disposed facing a back plate 4 which extends beyond the front plate. The portion of the back plate which extends beyond the front plate bears eleven control integrated circuits 18 on its "inside" surface, i.e. the surface which faces the front plate, said circuits having 64 outputs each and being connected by wires to tinned copper connection tracks 12 some of which lead to electrodes described hereinafter, the others being connected to metal-coated connection tabs 16 for flexible connection to outside circuits. This back plate constitutes a carrier plate.

Seven circuits 18 feed 416 column electrodes 22 deposited in the form of transparent vertical strips on the back plate. These electrodes are 200 microns wide and are spaced 350 microns apart. They are connected to the integrated circuits 18 by tinned copper tracks 12 which are disposed vertically.

Four circuits 18 feed 256 row electrodes 24 disposed like column electrodes 22 except that they are horizontal and are deposited on the "inside" surface of the front plate 2. These row electrodes are connected to the control circuits by metal connector studs 10 which interconnected the "inside" surfaces of the two plates, by horizontal transparent conductive strips 12a and by tinned copper tracks 12 deposited horizontally on the back plate 4 with the strip 12a forming a continuation of the tracks 12.

The number of flexible connections to be made between the "outside" circuits and the integrated circuits 18 is much smaller than the number of connections to be made between said integrated circuits 18 and the electrodes 22 and 24.

A metal spacer stud about 50 microns square is disposed in the centre of each of the free spaces 150 microns square which extend simultaneously between two row electrodes and two column electrodes, each said stud connecting together the two plates so as to maintain the gap 26 between the two plates at a constant thickness of 10 microns. A sealed chamber is formed between the two plates by a sealing strip extending all along the edge of the front plate 2 which is coextensive with an inner zone over which the chamber is formed.

Figure 4:
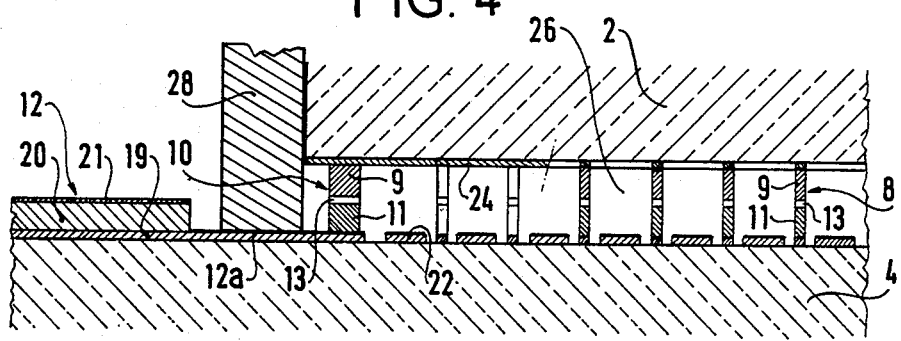
FIG. 4 illustrates a cross-section along a line IV—IV of FIG. 3.
Figure 5:
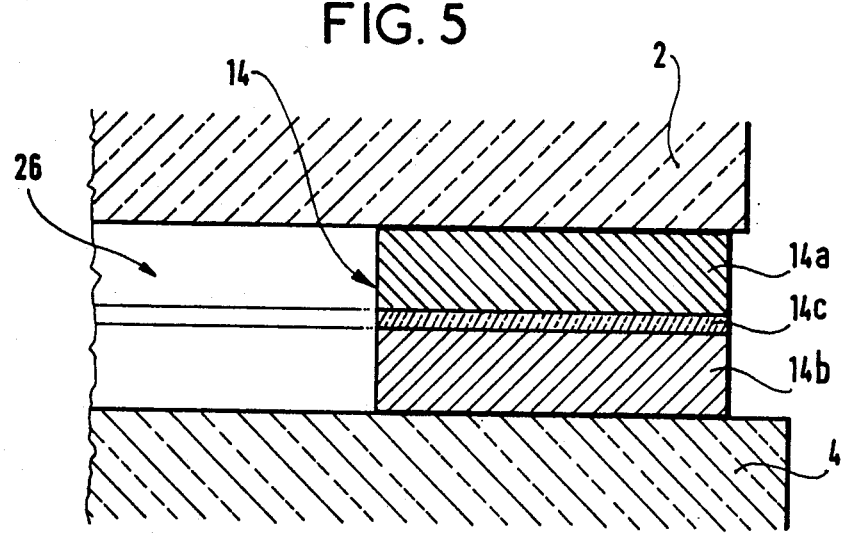
FIG. 5 illustrates a cross-section along a line V—V of FIG. 2.

This strip is constituted on two sides of the rectangle by an insulating adhesive 28 (FIG. 4) which locally covers the strips 12a and which is applied against the end surface of the front plate. On the other two sides of the rectangle it is constituted by a metal wall 14 disposed between the two plates and formed by two metal half walls 14a and 14b connected together by a metal connection layer 14c (FIG. 5). The chamber thus formed is filled with a liquid crystal whose birefringence is controlled by applying electric "display" signals between the row electrodes 24 and the column electrodes 22. The operation of this crystal and the characteristics of the display signals are described for example in the following French Pat. Nos.:

2,198,167—(A method of controlling an optical characteristic of a liquid crystal and apparatus for using this method).

2,238,167—(A method of controlling an image display apparatus).

2,279,123—(A method of controlling an optical characteristic of a substance and an analog image display apparatus which uses this method).

The method of manufacturing the cell 93 just described will now be given by way of example.

Two glass plates about 0.3 mm thick are prepared. They are, namely, the front plate 2 (150 mm×90 mm) and the back plate 4 (170 mm×110 mm).

They are cleaned by conventional industrial methods before being coated with metal. Photosensitive and insulating lacquers are then deposited through masks onto the front surface of the back plate and onto the rear surface of the front plate in conventional depositing and selective engraving operations.

Firstly, a continuous basic layer 19 of tin-doped indium oxide (of a composition known to the person skilled in the art as I.T.O.) is deposited for transparent conductive deposits. This layer is about 0.1 microns thick.

Then, copper is chemically deposited by an electrolysis depositing method to form a continuous priming coat approximately 0.2 microns thick.

A layer of copper about 3.7 microns thick is selectively formed by electrolysis (by a photo-mask) to constitute with this priming coat a main metal layer 20. The growth of this layer occurs only in zones which correspond to spacer studs 8, to connector studs 10 and to a sealing wall 14 on both plates and at the locations of the connection tracks 12 on the back plate.

Then a tin coating is chemically or electrolytically deposited so as to form a layer 21 of tin about 1 micron thick which layer constitutes a binder layer 13 on the half studs or 14c on the half walls 14b and making it easier to establish contacts on the tracks 12.

The layer of photosensitive resin which was deposited during the photo-masking operation is then removed from each plate.

The chemically-deposited copper is then removed and after another photo-masking operation the indium oxide undergoes an engraving (conventional chemical etching) operation. This last etching operation determines the position of the electrodes of each plate in such a way that the electrodes are placed horizontally on the front plate and vertically on the back plate.

Thereby, 416 column electrodes 200 microns wide spaced 150 microns apart are produced on the back plate and 256 row electrodes of the same width and same spacing are produced on the front plate.

Then the plates are cleaned to remove the photomask resins.

The two plates are then superposed, putting the half studs 9 of the front plate in contact with the half studs 11 of the back plate. The plates are held in this relative position by temporary assembly means.

These plate assembly means are then brought to a temperature of about 240° C. while exerting an evenly distributed pressure on the whole inner zone occupied by the studs. This welds together the connections between the two plates.

A sealing and insulating strip of epoxy adhesive for example is then deposited along the edge of the front plate. In one embodiment which is not illustrated this strip extends all around the inner zone.

Care is taken at this time to leave two openings in opposite corners. These two openings serve as access holes through which the cell is filled with liquid crystal and which are subsequently closed with drops of adhesive.

In an illustrated embodiment, two holes 2 mm in diameter are provided in the front plate, each hole facing a protrusion 30 in the sealing wall 14. Then, the plate is etched and covered with a deposit. This prevents two holes from being left in the strip of adhesive and allows the cell to be filled with liquid crystal by the same conventional technique of vacuum filling. In this version, after filling, the holes are closed by soldering, the solder adhering to the sealing wall. Of course, the protrusions 30 in this wall communicate with the inside of the cell and do not reach the outer surface of the wall.

The liquid crystals used in the embodiment of the invention are a conventional eutectic mixture of substances known as MBBA (methoxybenzylidene-butyl) and EBBA (ethoxybenzylidene-butyl) whose nematic effect is that of controlled birefringence.

This constitutes a cell which is capable of containing a liquid crystal layer of constant thickness and which has crossed electrodes on its inside surfaces and electric connection lines to link these electrodes to the outside. The advantage of these connection lines is that they are all brought onto a single surface, namely, in the example described, the front surface of the back plate which thus constitutes a "carrier" plate.

The cell is then equipped with its electronic control circuits, fixing the control integrated circuits on the front surface of the back plate which then performs the function of a substrate.

Advantageously, control integrated circuits 18 are used in their bare (chip) form and are interconnected with the connection tracks in accordance with techniques which are well-known in the microelectronics industry.

Solder surfaces 16 at the end of some connection tracks allow the cell to be connected to the outside.

Of, course, the connection between two halves 9 and 11 of each spacer stud 8 could possibly be formed by a conductive adhesive instead of a metal solder. Further, if the studs are entirely made of metal, they can be constituted not only by copper but also by other metals such as gold, nickel and palladium, the solder being constituted not only by tin but also by other metals such as indium or by an alloy.

The conductive tracks may be deposited of the same metal as the half studs on the carrier plate so that the control circuits can be conducted to the electrodes of the tube plates with the resistance per unit length of these tracks being less than that of the electrodes. The conductive tracks may be deposited simultaneous with that of the half studs of the carrier plate.

Although not illustrated, it can be advantageous for the thickness of the carrier plate 4 to be greater than that of the other plate so as to constitute a more rigid mechanical support.

It is also quite obvious that the half studs can be of different thicknesses on the two plates provided the total thickness of the studs finally obtained lies within the required tolerances.

A heat sensor, not illustrated, can advantageously be fixed to the carrier plate 4 to regulate the electronic control of the image display apparatus. (This necessity is well-known to the person skilled in the art: the response of the liquid crystals to a given signal varies with the operating temperature).

As is known, such a heat sensor controls a regulator circuit connected to the control circuits 18 so as to vary an amplitude characteristic or a phase characteristic of the display signals to obtain finally optical operation which is practically independent from heat. The connections necessary for such regulation are provided by tracks 12.

We claim:

1. A two-dimensional display unit with an electrically controlled fluid, said display unit including:
   a transparent front plate;
   a back plate disposed face to face with the front plate;
   a plurality of spacer studs all of identical thickness disposed between the front plate and the back plate and spaced out on the surfaces of these plates to maintain a predetermined micrometric gap between them;
   a sealing strip joining said plates along the edge of an inner zone which includes said studs to form a sealed chamber between said plates throughout said zone;
   a fluid having an optical characteristic which can be electrically controlled and being disposed in said chamber to form a thin active layer therein;
   electrodes disposed on said plates to apply various electric display signals to various points of said active layer so as to control the value of said optical characteristic at each of these points;
   connections to transmit display signals to said electrodes; and
   control circuits to generate said display signals so as to form a useful image in said active layer; the improvement wherein one of said plates in said display unit is a carrier plate which carries control circuits, each of which generates several display signals intended respectively to reach several of said electrodes carried by said plate;
   said carrier plate also carrying connection tracks to constitute at least partially the connections between the control circuits and the electrodes;
   each of said spacer studs being constituted by two half studs each of which adheres to one of said two plates and by a connection layer which connects the half studs together; and
   the half studs and the connection tracks being made of the same metal, and wherein:
   said two plates are insulating plates;
   said electrodes are row electrodes which form a succession of rows on the rear surface of the front plate and column electrodes which form a succession of columns on the front surface of the back plate;
   said display signals being row signals applied to these row electrodes and column signals applied to these column electrodes;
   the carrier plate carrying control circuits to generate both row signals and column signals on this plate;
   the display unit further including connector components which connect the said two plates together and transmit from the carrier plate the display signals which are to be applied to the electrodes of the other plates;
   the spacer studs being disposed both between the row electrodes and between the column electrodes;
   each of said connection components being in the shape of a connection stud constituted by two half studs made of the same metal as the connection tracks and each adhering to one of said two plates and by a conductive connection layer which connects the two half studs together.

2. A display unit according to claim 1, wherein said control circuits are at least partially carried by said carrier plate outside said inner zone.

3. A display unit according to claim 1, wherein said electrodes are constituted by conductive strips whose resistance per unit length is greater than that of the conductive tracks, and said active layer being made of a liquid crystal.

4. A display unit according to claim 1, wherein the non-carrier plate is a carried plate which is smaller than the carrier plate and is carried by this carrier plate via said studs, the control circuits being disposed on the carrier plate outside the zone covered by the carried plate, so as to facilitate maintenance of these circuits.

5. A method of manufacturing a two-dimensional display unit said method including the following steps:
   depositing electrodes on a transparent front plate and on a back plate;
   fixing said plates face to face so as to leave a constant micrometric gap between their facing "inside" surfaces;
   depositing a sealing strip which joins said plates together along the edge of an inner zone to form a sealed chamber between said plates, said inner zone containing said electrodes;
   filling said chamber with a fluid having an optical characteristic which is electrically controllable; and
   connecting said electrodes to control circuits which are suitable for supplying display signals to control said optical characteristic; the improvement wherein said step during which said plates are fixed face to face itself includes the following steps:
   depositing adhesive metal half studs on each of the inner surfaces in such a way that each half stud deposited on one of said plates is in register with a half stud deposited on the other of said plates, at least some of said studs being spacer studs spaced out in said inner zone;
   depositing a connection layer on the tops of the half studs of at least one of said plates;
   installing said plates with contact between the tops of the half studs which face each other; and
   forming connections between the half studs in contact via said connection layer so as to form studs which joins said plates together.

6. A method according to claim 5, wherein said step during which the electrodes are fixed to control circuits itself includes the following steps:
   depositing conductive tracks made of the same metal as the half studs on the carrier plate so that the control circuits can be connected to the electrodes of the two plates, the resistance per unit length of these tracks being less than that of the electrodes, this deposit being simultaneous to that of the half studs of the carrier plate, the connection layer being conductive and the connection between these tracks and the electrodes of the other plate being provided by means of some of the studs which are connector studs; and
   fixing said control circuits on the carrier plate, these circuits being connected to these conductive tracks.

7. A method according to claim 6, wherein said steps during which electrodes are deposited, conductive tracks are deposited and adhesive metal half studs are deposited include common depositing steps with selective engraving, namely:
   depositing a thin conductive basic layer to form simultaneously said electrodes, a first layer of said half studs and a first layer of connection tracks; and
   electrolitically depositing a main metal layer on the basic layer to form simultaneously a main layer of half studs and of connection tracks.

* * * * *